US 9,426,693 B2

(12) United States Patent
Wu et al.

(10) Patent No.: US 9,426,693 B2
(45) Date of Patent: Aug. 23, 2016

(54) ROBUSTNESS HEADER COMPRESSION PROCESSING METHOD, COMPRESSOR AND SYSTEM

(75) Inventors: Yong Wu, Shenzhen (CN); Xuehong Shi, Shenzhen (CN); Shusong Dong, Shenzhen (CN)

(73) Assignee: ZTE Corporation (CN)

( * ) Notice: Subject to any disclaimer, the term of this patent is extended or adjusted under 35 U.S.C. 154(b) by 221 days.

(21) Appl. No.: 14/234,848

(22) PCT Filed: Mar. 22, 2012

(86) PCT No.: PCT/CN2012/072785
§ 371 (c)(1),
(2), (4) Date: May 9, 2014

(87) PCT Pub. No.: WO2012/155664
PCT Pub. Date: Nov. 22, 2012

(65) Prior Publication Data
US 2014/0247772 A1    Sep. 4, 2014

(30) Foreign Application Priority Data
Jul. 27, 2011    (CN) .......................... 2011 1 0211930

(51) Int. Cl.
*H04W 4/00*    (2009.01)
*H04W 28/06*    (2009.01)
*H04L 29/06*    (2006.01)
*H04L 1/00*    (2006.01)

(52) U.S. Cl.
CPC ............ *H04W 28/065* (2013.01); *H04L 1/0006* (2013.01); *H04L 69/04* (2013.01); *H04L 69/22* (2013.01); *H04W 28/06* (2013.01)

(58) Field of Classification Search
None
See application file for complete search history.

(56) References Cited

U.S. PATENT DOCUMENTS

| 2005/0160184 A1* | 7/2005 | Walsh | H04L 12/1868 709/247 |
| 2008/0151861 A1* | 6/2008 | Zhang | H04L 1/0006 370/349 |
| 2010/0232455 A1* | 9/2010 | Watanabe | H04W 28/06 370/477 |

FOREIGN PATENT DOCUMENTS

| CN | 101998438 | 3/2011 |
| CN | 102291774 | 12/2011 |
| WO | 2007120335 | 10/2007 |

OTHER PUBLICATIONS

Pelletier, G., et al., RObust Header Compression Version 2 (ROHCv2): Profiles for RTP, UDP, IP, ESP and UDP-Lite. RFC 5225. Apr. 2008, Sections 6.9.1 and 6.9.2.3.

(Continued)

*Primary Examiner* — Chi H Pham
*Assistant Examiner* — Fahmida Chowdhury
(74) *Attorney, Agent, or Firm* — Plumsea Law Group, LLC

(57) ABSTRACT

A robustness header compression processing method, compressor and system are disclosed. The method includes: after receiving a CONTEXT_MEMORY option transmitted by a decompressor, a compressor selecting to use Profile0 to perform data compression on packets to be compressed; and after determining that a first threshold is reached by using the Profile0, the compressor performing data compression using a Profile type to which the packets to be compressed belong. In the above robustness compression processing method, compressor and system, after receiving a CONTEXT_MEMORY feedback option, a compressor selects a compression packet format Profile0 and attempts to restore normal compression and decompression after a certain period of time, thus improving efficiency and accuracy of compression and decompression as well as utilization of wireless bandwidth.

17 Claims, 7 Drawing Sheets

(56) References Cited

OTHER PUBLICATIONS

Jonsson, L-E., et al., RObust Header Compression (ROHC): A Compression Profile for IP. RFC 3843. Jun. 2004.

Bormann, C., et al., RObust Header Compression (ROHC): Framework and four profiles: RTP, UDP, ESP, and uncompressed. RFC 3095. Jul. 2001.

* cited by examiner

ROBUSTNESS HEADER COMPRESSION PROCESSING METHOD, COMPRESSOR AND SYSTEM

TECHNICAL FIELD

The present document relates to the field of mobile communications, and in particular, to a robustness header compression processing method, compressor and system.

BACKGROUND OF THE RELATED ART

Due to the limitation of physical conditions, in the mobile communication system, a wireless link has low transmission rate and high bit error rate as compared with a cable link. In order to effectively use the limited wireless channel bandwidth resources, the RObust Header compression (ROHC for short hereinafter) is introduced. The core of the ROHC is to use the information redundancy between packets of traffic stream to transparently compress and decompress information in the packet header between nodes which are connected directly. The ROHC technology is described by a RFC 3095 document of the Internet Engineering Task Force (IETF), but in the document, there is no definition of IP header compression and decompression, and therefore, in June 2004, the ROHC working group has to define one framework solely for the IP header compression and decompression in the RFC 3843, and in February 2007, the IETF revised the ROHC related document, and the revised document is RFC 4815.

In the ROHC header compression, different Profiles are used to identify different data packet streams, so that a corresponding data compression and decompression framework is applied on the data packet stream. For example, the Profile 0 identity is used to transmit IP data packet stream by the way of uncompressing, the Profile 1 identity is used to perform compression processing on RTP/UDP/IP data packet stream, the Profile 2 identity is used to perform compression processing on the UDP/IP data packet stream, the Profile 3 identity is used to perform compression processing on ESP/IP data packet stream, and the Profile 4 identity is used to perform compression processing on the IP data packet stream.

The feedback is the related state information concerning a related decompression party when performing decompression on the data packet, which is transmitted by the decompressing party to a compressing party according to the decompression result after receiving the compressed data packets and performing decompression on the data packets. The compression party performs corresponding processing according to the received feedback data, so as to compress the data packets better, accurately, and efficiently.

In the ROHC header compression, the feedback is divided into an ACK feedback (a data packet transmitted by the decompressor to the compressor when the decompressor successfully decompresses the compressed packets) and a NACK feedback (a data packet transmitted by the decompressor to the compressor when the decompressor erroneously decompresses the compressed data packet). The feedback which is transmitted by the decompressor to the compressor can also carry a feedback option, wherein, the feedback option is used to notify the compressing party of the detailed reason why the data decompression fails, so that the compressing party can specifically adjust its compression strategy, react as soon as possible, and enhance the robustness of the compression and decompression. The feedback option has a CRC option for checking the feedback packet, a REJECT option which indicates that the decompressor has not enough resources to perform data compression processing, and an SN option which indicates that the serial number carried in the feedback packet is unavailable etc.

There are many feedback options in the ROHC which are transmitted by the decompressing party to the compressing party, and the CONTEXT_MEMORY option is one of them, which represents that the decompressing party has not enough memory resources to support decompression of compressed data of some specified packet stream, and therefore, the decompressing party carries a CONTEXT_MEMORY option to the compressing party in the NACK feedback, and the compressing party performs corresponding adjustment when receiving the feedback option, so that the decompressing party can performs correct decompression.

In the RFC 3843, a method for processing the CONTEXT_MEMORY feedback option by the compressing party is defined, after receiving the CONTEXT_MEMORY option, the compressing party compresses the packet data by selecting compressed packets to make the decompressing party successfully decompress with the minimum memory space, or can stop compressing the packet stream data. However, in the RFC 3843, a compression method about how to select to make a decompressing party decompress the data packets with the minimum memory space has not been provided, and the scare of the memory resources of the decompressing party may not continue.

SUMMARY OF THE INVENTION

The technical problem to be solved by the present document is to provide a robustness header compression processing method, compressor and system, to solve the problem that how to select a compression mode is not presented in the prior art.

In order to solve the above technical problem, the present document further provides a robustness header compression processing method, comprising:

after receiving a CONTEXT_MEMORY option transmitted by a decompressor, a compressor selecting to use Profile0 to perform data compression on packets to be compressed; and after determining that a first threshold is reached by using the Profile0, the compressor performing data compression using a Profile type to which the packets to be compressed belong.

Preferably, the compressor initializes a first counter or a first timer after receiving a CONTEXT_MEMORY option, the first counter counts the number of the uses of the Profile0 or the first timer counts time for using the Profile0, and the compressor determines whether the first threshold is reached according to the first counter or the first timer.

Preferably, the compressor further initializes a second counter or a second timer after receiving a CONTEXT_MEMORY option concerning a current packet stream for the first time, the second counter counts the number of the receptions of the CONTEXT_MEMORY option or the second timer counts time for using the Profile0, and after the compressor determines that the second threshold is reached, the compressor uses the Profile0 continuously to perform data compression on the packets to be compressed.

Preferably, the compressor sets an option feedback identity as a first identity after receiving the CONTEXT_MEMORY option, sets the option feedback identity as a second identity after receiving a feedback (ACK) representing a successful decompression and when the first counter or the first timer reaches the first threshold, and the first counter or the first timer resets after reaching the first threshold.

Preferably, the first counter counts the number or the first timer counts the time when the option feedback identity is the first identity, and stops counting the number or counting the time when the option feedback identity is the second identity.

Preferably, the second counter or the second timer is cleared after the compressor receives the ACK feedback.

Preferably, the first threshold is proportional to a current value of the current second counter or second timer.

In order to solve the above technical problem, the present document further provides a robustness header compressor, comprising:

a feedback receiving module, configured to receive a feedback transmitted by a decompressor, including receiving a feedback (NACK) of a failed decompression carrying a CONTEXT_MEMORY option;

a Profile0 compressing module, configured to after receiving a CONTEXT_MEMORY option, use Profile0 to perform data compression on packets to be compressed; and a Profile type compressing module, configured to perform data compression using a Profile type to which the packets to be compressed belongs after a first threshold is reached by using the Profile0.

Preferably, the robustness header compressor further comprises:

an initializing module, configured to initialize a first counter or a first timer after receiving a CONTEXT_MEMORY option;

a first counter or a first timer, configured to count the number of the uses of the Profile0 or count the time for using the Profile0;

a threshold determining module, configured to determine whether the first threshold is reached by the first counter or the first timer;

the Profile type compressing module is configured to determine that a first threshold is reached by using Profile0 when the first counter or the first timer reaches the first threshold.

Preferably, the robustness header compressor further comprises a second counter or a second timer;

the initializing module is further configured to initialize the second counter or the second timer after receiving a CONTEXT_MEMORY option of a current packet stream for the first time;

the second counter or the second timer is configured to count the number of the receptions of the CONTEXT_MEMORY option or count the time for using the Profile0;

the threshold determining module is further configured to determine whether the second threshold is reached by the second counter or the second timer; and the Profile0 compressing module is further configured to use the Profile0 continuously to perform data compression on packets to be compressed after the second threshold is reached.

Preferably, the compressor further comprises an option feedback identity maintaining module, configured to: set an option feedback identity as a first identity after receiving a CONTEXT_MEMORY option, set the option feedback identity as a second identity after receiving a feedback (ACK) representing a successful decompression and when the first counter or the first timer reaches the first threshold; and the first counter or the first timer is further used to reset after reaching the first threshold.

Preferably, the first counter or the first timer is further configured to count the number or count the time when the option feedback identity is the first identity, and stop counting the number or counting the time when the option feedback identity is the second identity.

Preferably, the second counter or the second timer is further configured to be cleared after receiving the ACK feedback.

Preferably, the first threshold is proportional to a current value of the current second counter or second timer.

In order to solve the above technical problem, the present document further provides a robustness header compression processing system, which comprises the robustness header compressor and decompressor as described above, wherein, the decompressor is configured to only transmit a feedback (ACK) representing a successful decompression to the robustness header compressor when the decompression for the data packets of a Profile type to which a packet stream belongs is successful for the first time after transmitting a feedback (NACK) of a failed decompression carrying a CONTEXT_MEMORY option.

In the robustness header compression processing method, system and robustness header compressor of the embodiments of the present document, a compressing party selects a compression packet format Profile0 after receiving a CONTEXT_MEMORY feedback option and attempts to restore normal compression and decompression after a certain period of time after receiving a CONTEXT_MEMORY feedback option, thus improving efficiency and accuracy of compression and decompression as well as utilization of wireless bandwidth.

PREFERRED EMBODIMENTS OF THE INVENTION

Figure 1:
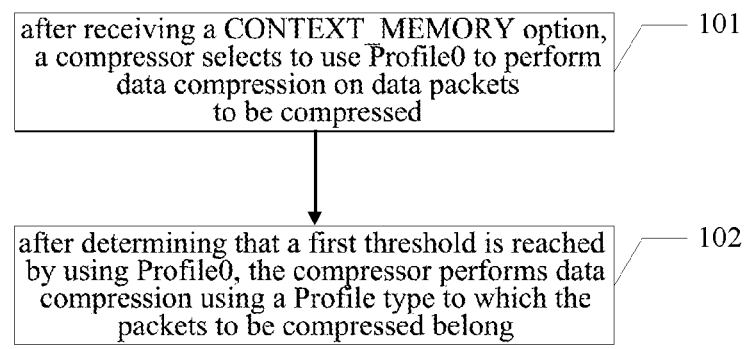
FIG. 1 is a diagram of embodiment one of a robustness header compression processing method according to an embodiment of the present document.

The primary idea of the robustness header compression processing method, system and robustness header compressor of the present document is that, after receiving a CONTEXT_MEMORY feedback option, a compressing party selects a compression packet format by which the decompressing party can consume a minimum memory space to decompress correctly and attempts to restore normal compression and decompression after a certain period of time after receiving a CONTEXT_MEMORY feedback option, thus improving efficiency and accuracy of compression and decompression as well as utilization of wireless bandwidth.

The embodiments of the present document will be described in detail below in conjunction with accompanying drawings. It should be illustrated that, embodiments in the present application and features in the embodiments can be randomly combined with each other without conflict.

Embodiment One

Embodiment one of a robustness header compression processing method according to the present document comprises the following steps.

In step 101, after receiving a CONTEXT_MEMORY option, a compressor selects to use Profile0 to perform data compression on data packets to be compressed (packets to be compressed in the present document, for short);

the compressor initializes a first counter or a first timer after receiving a CONTEXT_MEMORY option, the first counter counts the number of the uses of the Profile0 or the first timer counts the time for using the Profile0, and the compressor determines whether the first threshold is reached according to the first counter or the first timer.

Profile 0 identity is used to transmit the IP data packet stream by the way of uncompressing.

In step 102, after determining that a first threshold is reached by using Profile0, the compressor performs data compression using a Profile type to which the packets to be compressed belong.

Preferably, the compressor also initializes a second counter or a second timer after receiving a CONTEXT_MEMORY option concerning a current packet stream for the first time, the second counter counts the number of the receptions of the CONTEXT_MEMORY option (i.e., initializes (or resets) a number of the first counter or timer) or the second timer counts the time for using the Profile0, preferably, the second threshold of the second counter or the second timer is set to be greater than the first threshold, and after determining that the second threshold is reached, the compressor uses the Profile0 continuously to perform data compression on packets to be compressed and does not try to use a Profile type to which the data packets belong to perform data compression.

Preferably, the compressor sets an option feedback identity as a first identity after receiving the CONTEXT_MEMORY option, sets the option feedback identity as a second identity after receiving a feedback (ACK) representing a successful decompression and when the first counter or the first timer reaches the first threshold, and the first counter or the first timer resets after reaching the first threshold.

Preferably, the first counter or the first timer counts the number or counts the time when the option feedback identity is the first identity, and stops counting the number or counting the time when the option feedback identity is the second identity.

The compression processing method according to the present document is a method for processing packets to be compressed for one packet stream.

Embodiment Two

In embodiment two, the processing by a compressing party on a CONTEXT_MEMORY feedback option is implemented by a compressing party setting one identity and summing two counters; the decompressing party sets one identity for recoding whether the CONTEXT_MEMORY feedback option is transmitted, aiding in the decompressing party removing an effect generated by the CONTEXT_MEMORY feedback option timely when the compressed packets are successfully decompressed subsequently. The counter controls the compressor to compress the packet data of a specified packet stream using profile 0 in a certain period of time, and reselect a Profile type to which the packet stream belongs to compress the data packet stream, to ensure the efficiency of the compression, and if the compressor continues to receive the CONTEXT_MEMORY feedback option after the reselection, the number of the receptions of the feedback is accumulated, and when the number of the receptions of the CONTEXT_MEMORY feedback option reaches a certain value, the Profile 0 is used all the time to perform compression on the data packet stream, which implements effective processing for the CONTEXT_MEMORY feedback option.

The implementation scheme of the compressing party processing the CONTEXT_MEMORY feedback option involved in the present document will be further described in detail below in conjunction with accompanying drawings.

Figure 2:
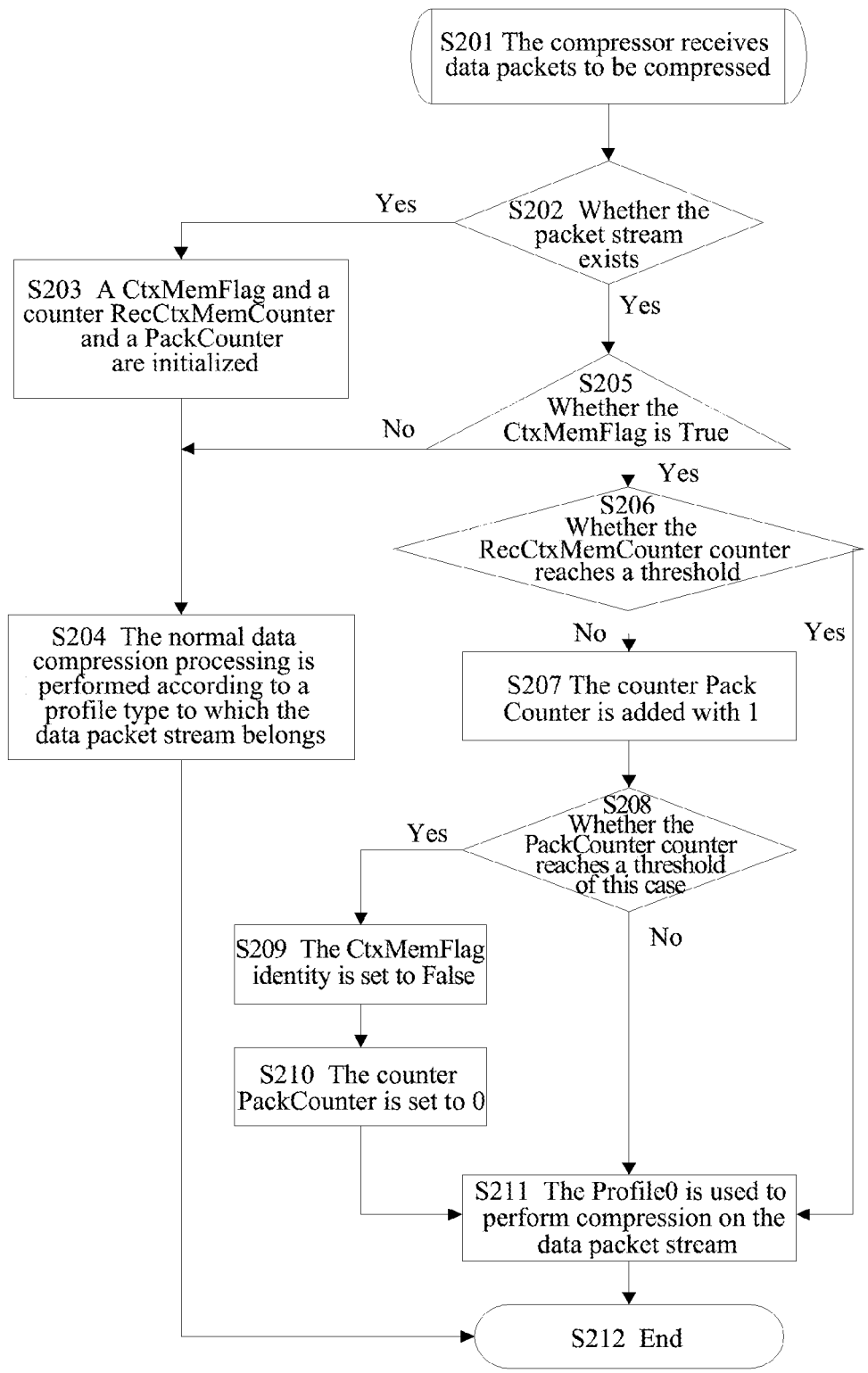
FIG. 2 is a flowchart of a process when a compressor receives a CONTEXT_MEMORY feedback option according to an embodiment of the present document.

As shown in FIG. 2, the processing flow after a compressor receives data packets to be compressed includes the following steps.

In step S201, the compressor receives data packets to be compressed;

in step S202, whether the packet stream exists is determined, if the packet stream does not exist, it is to proceed to step S203, otherwise, it is to proceed to step S205;

in step S203, a CtxMemFlag and a counter RecCtxMemCounter (the number of option feedbacks) and a PackCounter (packet count) are initialized;

The CtxMemFlag is also referred to as an option feedback identity, the initialized CtxMemFlag identity is False, and the initialized counters RecCtxMemCounter and PackCounter are set to 0.

In step S204, the data compression processing is performed according to a profile type to which the data packet stream belongs, and it is to proceed to step S212;

In step S205, the processing is selected according to the CtxMemFlag identity, if the CtxMemFlag identity is True, it is to proceed to step S206, and if the CtxMemFlag identity is False, it is to proceed to step S204.

In step S206, whether the RecCtxMemCounter counter reaches a threshold is determined, and if the threshold is reached, it is to proceed to step S211; otherwise, it is to proceed to step S207.

In step S207, the counter PackCounter is added with 1;

In step S208, whether the PackCounter counter reaches a threshold is determined, and if the threshold is reached, it is to proceed to step S209; otherwise, it is to proceed to step S211.

In step S209, the CtxMemFlag identity is set to False;

in step S210, the counter PackCounter is set to 0;

in step S211, the Profile0 is used to perform compression on the data packet stream;

In step S212, the processing flow after the compressor receives the data packets ends.

It can be known from the above flow that, different processing are performed in different cases:

A1) the compressor receives packets to be compressed, if the packets are a new packet stream, counters PackCounter and RecCtxMemCouter are established for the packet stream and are initialized to 0, and CtxMemFlag is set to 0 (False), which represents that the compression processing is performed on the packet stream using a Profile type to which the packet stream belongs, and a corresponding context for the packet stream is established.

Wherein, the Profile 1 identity is used to perform compression processing on RTP/UDP/IP data packet stream, the Profile 2 identity is used to perform compression processing on the UDP/IP data packet stream, the Profile 3 identity is used to perform compression processing on ESP/IP data packet stream, and the Profile 4 identity is used to perform compression processing on the IP data packet stream.

A2) the compressor receives packets to be compressed, if the packet stream already exists, the CtxMemFlag is true and the RecCtxMemCouter counter does not reach the threshold, the counter PackCounter is added with 1, and counter PackCounter does not reach the threshold, and data compression is performed on the packet stream using profile 0 type.

A3) the compressor receives packets to be compressed, if the packet stream already exists, the CtxMemFlag is true and the RecCtxMemCouter counter does not reach the threshold, the counter PackCounter is added with 1, the counter PackCounter reaches the threshold, the CtxMemFlag identity is set to False, the counter PackCounter is set to 0, and data compression is performed on the packet stream using profile 0 type.

A4) the compressor receives packets to be compressed, if the packet stream already exists and the CtxMemFlag is False, the profile type to which the packet stream belongs is used to perform compression on the packet stream, and the counter PackCounter remains 0, i.e., the counting is stopped.

The counter PackCounter is used to count the number of the uses of profile0, alternatively, the counter can be replaced with a timer to count the time for using the profile0, both of them have the same effect.

A value of the threshold of the counter PackCounter is fixed or variable, preferably, the threshold of the counter PackCounter can be adjusted according to a current value of the RecCtxMemCouter counter multiplied by a fixed coefficient, i.e., the threshold of the counter PackCounter is proportional to the current value of theRecCtxMemCouter counter, thus, with the increase of the number of the received CONTEXT_MEMORY feedback options, the count value of the RecCtxMemCouter counter also increases gradually, and each time when the RecCtxMemCouter counter increases, the threshold of the counter PackCounter increases once accordingly, and at the same time, the time for using the profile0 type to compress the data packets increases therewith.

In the above implementation steps, the thresholds of the counter RecCtxMemCounter and the counter PackCounter are determined according to the actual cases, wherein, in the step S108 (FIG. 2), the threshold of the counter PackCounter is preferably a counter value of the counter RecCtxMemCounter multiplied by a fixed value, and by this way, the compressor effectively selects the type for compressing the packets when receiving the CONTEXT_MEMORY feedback option.

Figure 3:
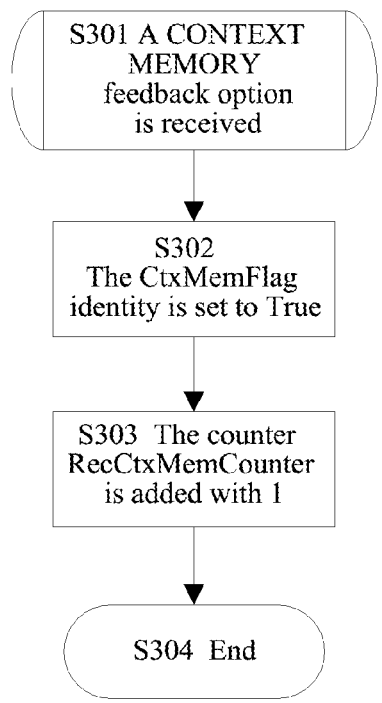
FIG. 3 is a flowchart of a data processing strategy when a compressor receives a data packet stream according to an embodiment of the present document.

As shown in FIG. 3, a processing flow after a compressor receives a CONTEXT_MEMORY feedback option includes the following steps.

In step S301, the compressor receives a NACK feedback carrying a CONTEXT_MEMORY feedback option;

in step S302, the CtxMemFlag identity is set to True;

in step S303. the counter RecCtxMemCounter is added with 1;

in step S304, the flow ends.

It can be known in conjunction with the above procedures of FIGS. 2 and 3 that, the counter RecCtxMemCounter is a counter which counts the number of receptions of CONTEXT_MEMORY feedback option related to the current packet stream. Alternatively, the counter RecCtxMemCounter can be replaced with a timer, which counts the time for using the Profile0, both of them have the same effect.

When the ACK feedback is received, it illustrates that the decompressing party has enough memory space to perform compression processing on the data, all original processing on the CONTEXT_MEMORY option can be reset, including setting the counter RecCtxMemCounter to 0.

Thus, the value of the counter RecCtxMemCounter is cleared after the count value reaches a certain value (after receiving the ACK feedback), and is 0 all the time (does not receive the CONTEXT_MEMORY feedback option).

In addition, except for the case that the compressor does not support the Profile type to which the packet stream belongs, after receiving the CONTEXT_MEMORY option, the compressor selects to use Profile0 to perform data compression on the data packets to be compressed.

It can be understood that, when the compressor uses Profile0 to perform data compression, the NACK feedback carrying the CONTEXT_MEMORY feedback option will not be received.

Figure 4:
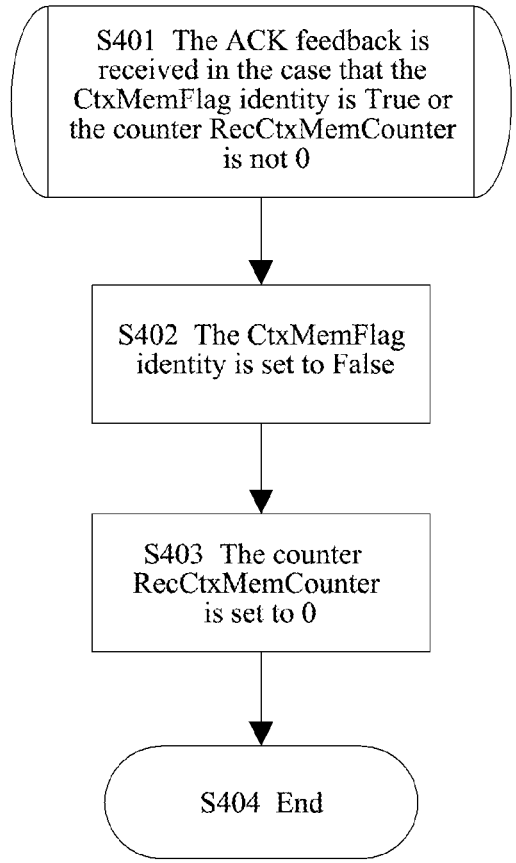
FIG. 4 is a flowchart of a process of a compressor receiving an ACK feedback after receiving a CONTEXT_MEMORY feedback option according to an embodiment of the present document.

As shown in FIG. 4, the procedure after the compressor receives the ACK feedback carried includes the following steps.

In step S401, the compressor receives the ACK feedback;

When the CtxMemFlag identity is True or the RecCtxMemCounter is not zero, the procedure is performed.

In step S402, the CtxMemFlag identity is set to False;

In step 403, the counter RecCtxMemCounter is set to 0.

In step S404, the procedure ends.

Figure 5:
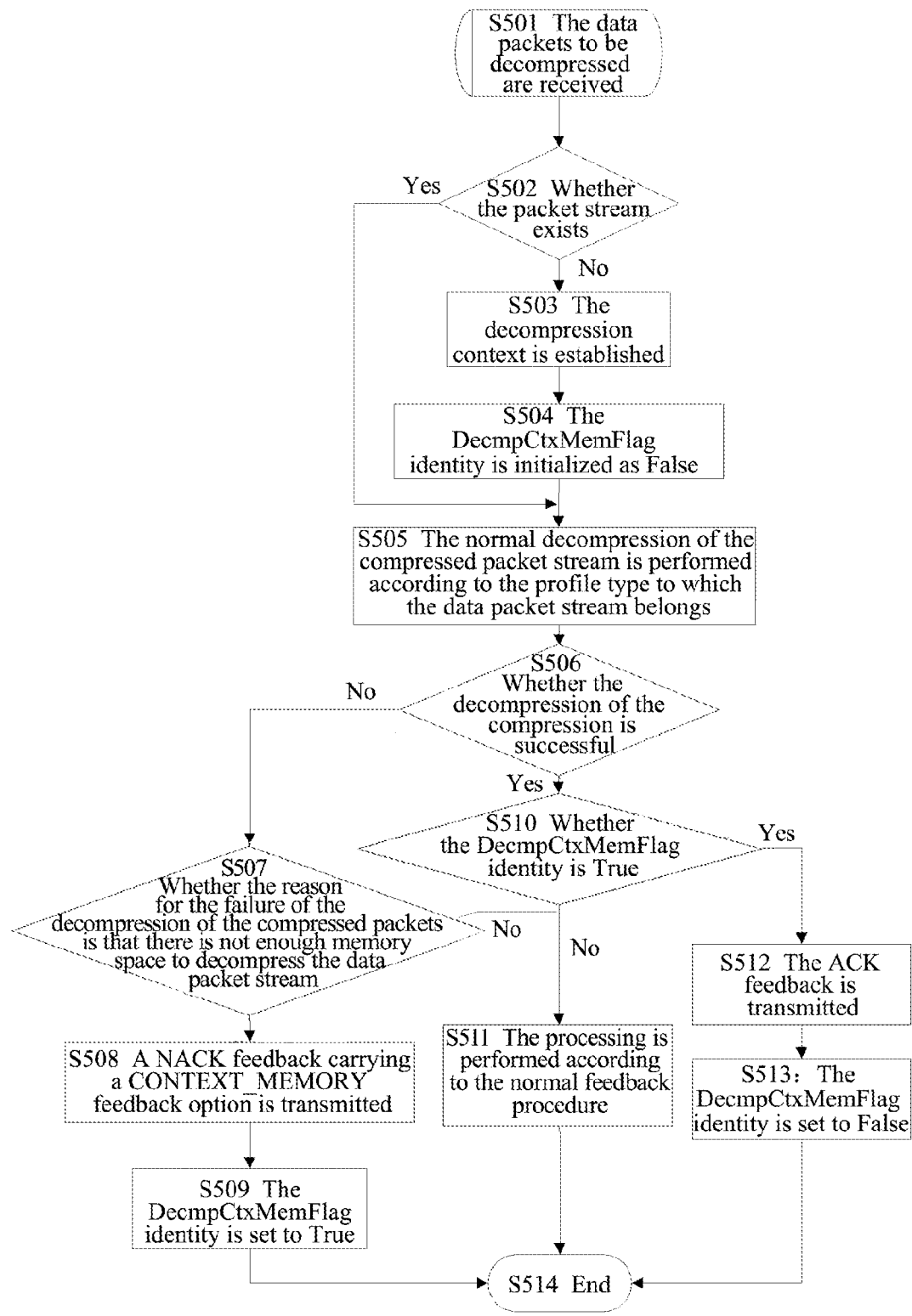
FIG. 5 is a process performed by a decompressor on received compressed packets after transmitting a CONTEXT_MEMORY feedback option according to an embodiment of the present document.

As shown in FIG. 5, the processing flow after the decompressor receives the packets to be decompressed includes the following steps.

In step S501, the decompressor receives the data packets to be decompressed;

in step S502, whether the packet stream exists is determined, and if the packet stream does not exist, it is to proceed to step S503, otherwise, it is to proceed to step S505;

in step S503, the decompression context to which the packet stream belongs is established;

in step S504, the DecmpCtxMemFlag (decompression packet stream) identity is initialized as False;

in step S505, the decompression is performed according to the profile type to which the compressed packet stream belongs;

in step S506, whether the decompression for the compressed packets is successful is determined, if the decompression is successful, it is to proceed to step S510; otherwise, it is to proceed to step S507;

in step S507, whether the reason for the failure of the decompression for the compressed packets is that there is not enough memory space to decompress the compressed data is determined, if so, it is to proceed to step S508; otherwise, it is to proceed to step S511;

in step S508, a NACK feedback carrying a CONTEXT_MEMORY feedback option is transmitted;

in step S509, the DecmpCtxMemFlag identity is set to True;

in step S510, whether the DecmpCtxMemFlag identity is True is determined, and if the DecmpCtxMemFlag identity is True, it is to proceed to step S512; otherwise, it is to proceed to step S511;

in step S511, the feedback processing is performed according to the normal procedure;

in step S512, the ACK feedback is transmitted;

in step S513, the DecmpCtxMemFlag identity is set to False;

in step S514, the processing flow after the decompressor receives the compressed data ends;

it can be known according to the above procedure that, the decompressor performs different processes in different cases:

B1) the decompressor receives the data packets to be decompressed, if the packet stream is a new packet stream, a DecmpCtxMemFlag identity is established for the packet stream and the DecmpCtxMemFlag identity is set to 0 (False), the compressed packet stream is decompressed, if the decompression for the compressed packets fails since there is not enough memory space to decompress the compressed data packets, a NACK feedback carrying the CONTEXT_MEMORY feedback option is transmitted. The DecmpCtxMemFlag identity is set to True. If the decompression for the compressed packets fails due to other reasons, the processing is performed according to the existing procedure.

B2) the decompressor receives the data packets to be decompressed, if the packet stream is a new packet stream, a DecmpCtxMemFlag identity is established for the packet stream and the DecmpCtxMemFlag identity is set to 0 (False), the compressed packet stream is decompressed, if the decompression for the compressed packets is successful, the processing is performed according to the existing procedure.

B3) the decompressor receives the data packets to be decompressed, if the packet stream already exists and the decompression for the compressed packets is successful, the processing is performed according to the existing procedure.

B4) the decompressor receives the data packets to be decompressed, if the packet stream already exists and the decompression for the compressed packets is successful and the DecmpCtxMemFlag identity is True, an ACK feedback is transmitted, and the DecmpCtxMemFlag identity is set to False.

B5) the decompressor receives the data packets to be decompressed, if the packet stream already exists and the decompression for the compressed packets fails, if the decompression for the compressed packets fails since there is not enough memory to decompress the compressed data packets, a NACK feedback carrying the CONTEXT_MEMORY feedback option is transmitted. The DecmpCtxMemFlag identity is set to True. If the decompression for the compressed packets fails due to other reasons, the processing is performed according to the existing procedure.

Embodiment Three

Figure 6:
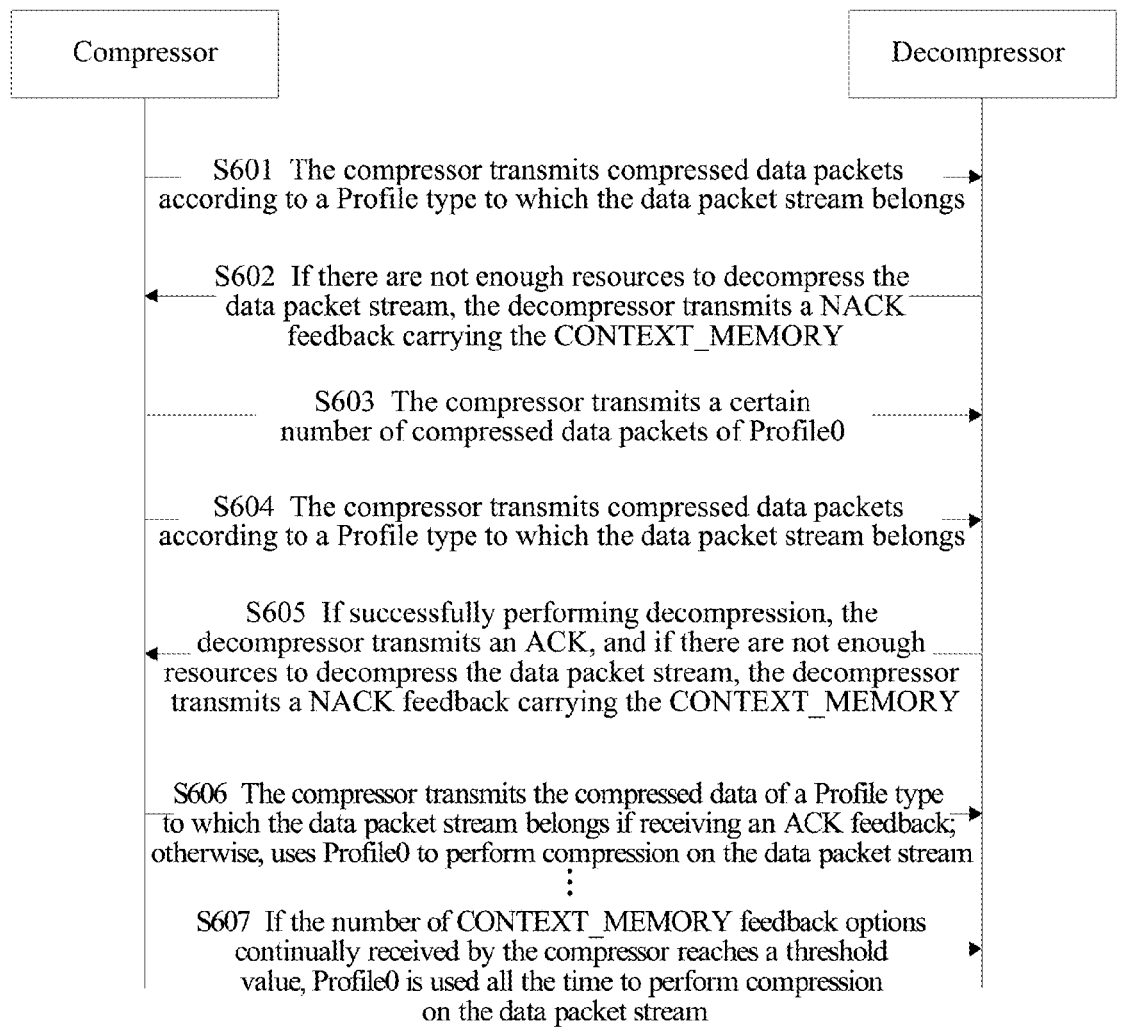
FIG. 6 is a compression and decompression procedure for a CONTEXT_MEMORY feedback option of data between a compressor and a decompressor according to an embodiment of the present document.

As shown in FIG. 6, a procedure of embodiment three of a robustness header compression processing method includes the following steps.

in step S601, the compressor transmits compressed data packets according to a Profile type to which the data packet stream belongs;

in step S602, if there are not enough resources to decompress the data packet stream, the decompressor transmits a NACK feedback carrying the CONTEXT_MEMORY;

in step S603, the compressor transmits a certain number of compressed data packets of Profile0 according to the above received NACK feedback;

in step S604, the compressor transmits compressed data packets according to a Profile type to which the data packet stream belongs;

in step S605, if successfully performing decompression, the decompressor transmits an ACK, and if there are not enough resources to decompress the data packet stream, the decompressor transmits a NACK feedback carrying the CONTEXT_MEMORY;

in step S606, the compressor transmits compressed data of a Profile type to which the data packet stream belongs if receiving an ACK feedback, and uses Profile0 to perform compression on the data packet stream if receiving the NACK feedback carrying CONTEXT_MEMORY;

In step S607, if the number of CONTEXT_MEMORY feedback options continually received by the compressor reaches a threshold value, Profile0 is used all the time to perform compression on the data packet stream, otherwise, it is to return to step S603.

In the above procedure, the decompressor only transmits a feedback (ACK) representing successful decompression to the robustness header compressor when the decompression for data packets of a Profile type to which a packet stream belongs is successful for the first time after transmitting a feedback (NACK) of a failed decompression carrying a CONTEXT_MEMORY option, which is a preferable scheme with a minimum modification of the existing procedure, of course, the decompressor can also transmit the feedback (ACK) representing a successful decompression to the robustness header compressor after the decompression is successful.

Figure 7:
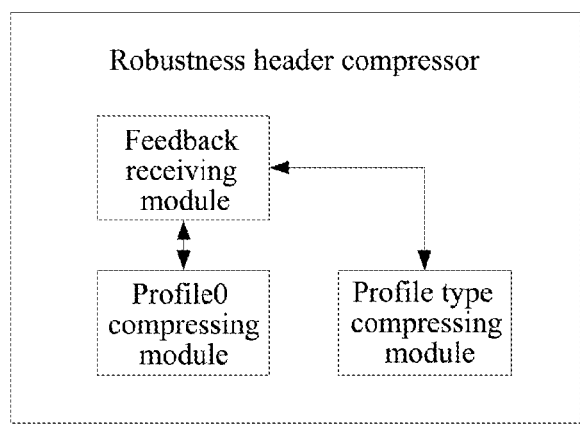
FIGS. 7 to 10B are structure diagrams of modules of embodiments one to four of a robustness header compressor according to the present document.

Corresponding to the above described method, the present document further provides embodiment one of a robustness header compressor, as shown in FIG. 7, particularly related to the present document, the robustness header compressor includes:

a feedback receiving module, configured to receive a feedback transmitted by a decompressor, including receiving a feedback (NACK) of a failed decompression carrying a CONTEXT_MEMORY option;

a Profile0 compressing module, configured to use Profile0 to perform data compression on packets to be compressed after receiving a CONTEXT_MEMORY option; and a Profile type compressing module, configured to perform data compression using a Profile type to which the packets to be compressed belong after a first threshold is reached by using Profile0.

Figure 8:
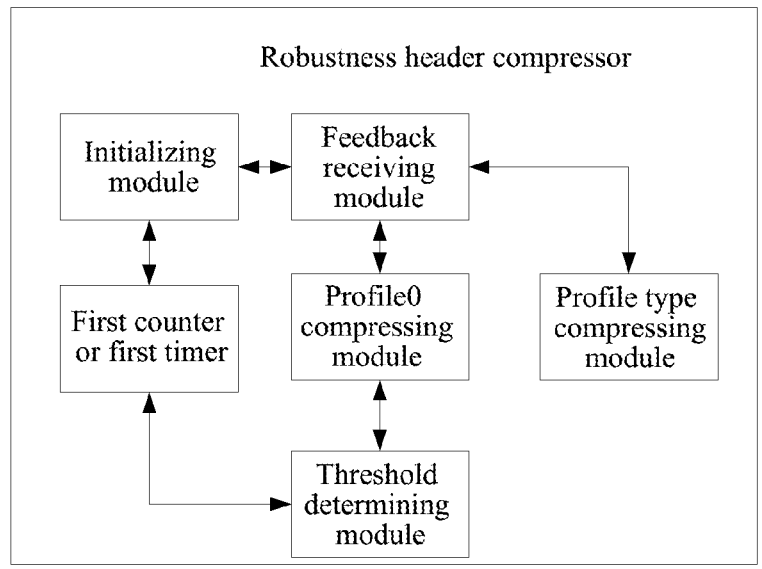

Embodiment two of the robustness header compressor is shown in FIG. 8, and the difference between the embodiment two and the embodiment illustrated in FIG. 7 is that the robustness header compressor shown in FIG. 8 further comprises:

an initializing module, configured to initialize a first counter or a first timer after receiving a CONTEXT_MEMORY option;

the first counter or the first timer, configured to count the number of the uses of the Profile0 or count the time for using the Profile0;

a threshold determining module, configured to determine whether the first threshold is reached by the first counter or the first timer;

the Profile type compressing module determines that a first threshold is reached by using the Profile0 when the first counter or the first timer reaches the first threshold.

Figure 9:
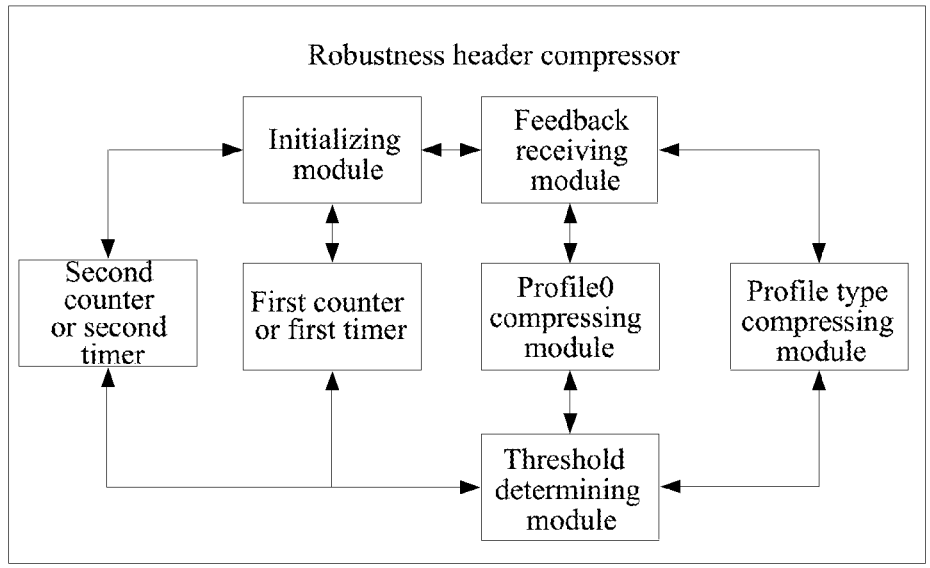

Embodiment three of the robustness header compressor is shown in FIG. 9, and the difference between the embodiment three and the embodiment two of the robustness header compressor is that the robustness header compressor of embodiment three further comprises a second counter or a second timer; wherein, the initializing module is further used to initialize the second counter or the second timer after receiving a CONTEXT_MEMORY option of a current packet stream for the first time;

the second counter or the second timer is used to count the number of the receptions of the CONTEXT_MEMORY option or count the time for using the Profile0;

the threshold determining module is further used to determine whether the second threshold is reached by the second counter or the second timer; and the Profile0 compressing module is further used to use the Profile0 continuously to perform data compression on packets to be compressed after the second threshold is reached.

Figure 10A:
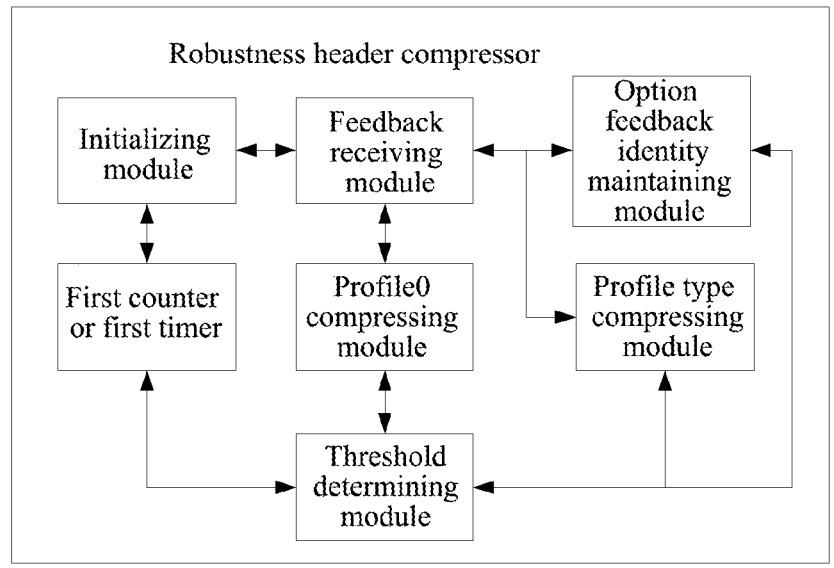
Figure 10B:
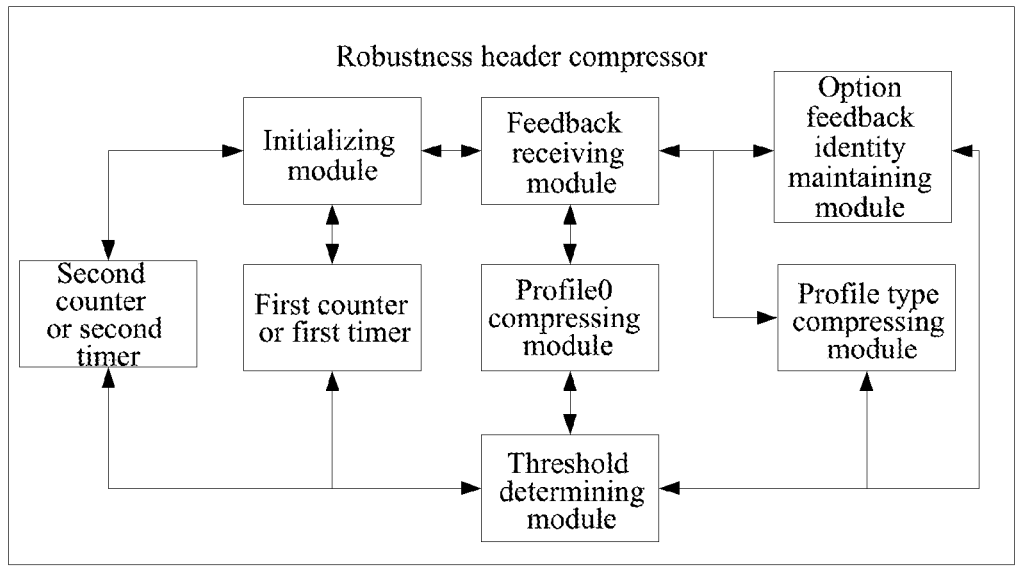

Embodiment four of the robustness header compressor is shown in FIGS. 10A and 10B, and the difference between the embodiment four and the embodiment two or three is that the compressor embodiment four further comprises an option feedback identity maintaining module, which is used to: set an option feedback identity as the first identity after receiving a CONTEXT_MEMORY option, and is further used to set the option feedback identity as the second identity after receiving a feedback (ACK) representing a successful decompression and when the first counter or the first timer reaches the first threshold, and the first counter or the first timer is further used to reset after reaching the first threshold.

Preferably, in the above embodiment four, the first counter or the first timer counts the number or counts the time when the option feedback identity is the first identity, and stops counting the number or counting the time when the option feedback identity is the second identity.

Further, in the above embodiments three and four, the second counter or the second timer is further used to be cleared after receiving the ACK feedback. Preferably, the first threshold is proportional to a current value of the current second counter or second timer.

In addition, the present document further provides a robustness header compression processing system, comprising the robustness header compressor or decompressor as described above, wherein, the compressor is used to transmit a feedback (ACK) of a successful decompression to the robustness header compressor when the decompression is successful, or only transmit a feedback (ACK) of a successful decompression to the robustness header compressor when the decompression for data packets of a Profile type to which a packet stream belongs is successful for the first time after transmitting a feedback (NACK) of a failed decompression carrying a CONTEXT_MEMORY option.

The present document overcomes the problem in the prior art that the decompressing party can not decompress correctly due to the compressing party being unable to select a compression packet format with a less memory consumption for the decompression when processing the CONTEXT_MEMORY feedback option, and enhances the efficiency of the compression algorithm by trying to restore normal compression and decompression after a period of time after receiving the CONTEXT_MEMORY feedback option, and advantages of using this method is as follows.

A suitable compression packet format can be selected to compress the data to be compressed after receiving the CONTEXT_MEMORY feedback option, which ensures that there is enough memory at the decompressing party for decompressing the compressed packets generated by the compressing party;

Whether the limitation on the memory resources at the decompressing party is released is sounded by periodically using an original compression context for compressing the data packets, then the original context can be used to continue to compress and decompress the packet stream, thus enhancing the efficiency of the compression and decompression;

The decompressing party is allowed to receive the compressed packets of the present packet stream to try to decompress after transmitting the CONTEXT_MEMORY feedback option, if the decompression is successful, the decompressed data are submitted to an upper layer application, otherwise, the CONTEXT_MEMORY feedback option continues to be transmitted to the compressing party, to alert the compressing party to adjust the compression strategy.

After receiving the CONTEXT_MEMORY feedback option, the Profile0 is selected to be used to perform data compression, so that the decompressing party can have enough memory space to decompress the compressed data.

A person having ordinary skill in the art can understand that all or a part of steps in the above method can be implemented by programs instructing related hardware, and the programs can be stored in a computer readable storage medium, such as a read-only memory, disk or CD-ROM etc. Alternatively, all or a part of steps in the above embodiments can also be implemented by one or more integrated circuits. Accordingly, each module/unit in the above embodiments can be implemented in a form of hardware, and can also be implemented in a form of software functional module. The present document is not limited to a combination of any particular forms of hardware and software.

The above description is only the preferred embodiments of the present document and is not intended to limit the present document. For those skilled in the art, the invention can have various modifications and variations. Any of modification, equivalent and improvement etc., which is made within the spirit and principle of the present document, should be contained within the protection scope of the present document.

INDUSTRIAL APPLICABILITY

In the robustness header compression processing method, system and robustness header compressor of the embodiments of the present document, a compressing party selects a compression packet format Profile0 after receiving a CONTEXT_MEMORY feedback option and attempts to restore normal compression and decompression after a certain period of time after receiving a CONTEXT_MEMORY feedback option, thus improving efficiency and accuracy of compression and decompression as well as utilization of wireless bandwidth.

What is claimed is:

1. A robustness header compression processing method, comprising:
receiving, by a compressor, a feedback transmitted by a decompressor, including a feedback (NACK) of a failed decompression carrying a CONTEXT_MEMORY option;
after receiving the CONTEXT_MEMORY option transmitted by the decompressor, a compressor selecting to use Profile0 to perform data compression on packets to be compressed of a packet stream; and
after determining that a number of the uses of the Profile0 to packets of the same packet stream or time for using the Profile0 to packets of the same packet stream reaches a first threshold, the compressor performing data compression using a Profile type to which the packets to be compressed belong.

2. The method according to claim 1, wherein, the compressor initializes a first counter or a first timer after receiving the CONTEXT_MEMORY option, the first counter counts a number of the uses of the Profile0 to packets of the same packet stream or the first timer counts time for using the Profile0 to packets of the same packet stream, and the compressor determines whether the first threshold is reached according to the first counter or the first timer.

3. The method according to claim 2, wherein, the compressor further initializes a second counter or a second timer after receiving a CONTEXT_MEMORY option concerning a current packet stream for a first time, the second counter counts a number of the receptions of the CONTEXT_MEMORY option or the second timer counts the time for using the Profile0 to packets of the same packet stream, and after the compressor determines that a second threshold is reached, the compressor uses the Profile0 continuously to perform data compression on the packets to be compressed.

4. The method according to claim 1, wherein, the compressor sets an option feedback identity as a first identity after receiving the CONTEXT_MEMORY option, sets the option feedback identity as a second identity after receiving a feedback (ACK) representing a successful decompression and when the first counter or the first timer reaches the first threshold, and the first counter or the first timer resets after reaching the first threshold.

5. The method according to claim 4, wherein, the first counter counts the number or the first timer counts the time when the option feedback identity is the first identity, and stops counting the number or counting the time when the option feedback identity is the second identity.

6. The method according to claim 3, wherein, the second counter or the second timer is cleared after the compressor receives the ACK feedback.

7. The method according to claim 3, wherein, the first threshold is proportional to a current value of the current second counter or second timer.

8. A robustness header compressor, comprising:
a processor;
a feedback receiving module, implemented by the processor and configured to receive a feedback transmitted by a decompressor, including receiving a feedback (NACK) of a failed decompression carrying a CONTEXT_MEMORY option;
a Profile0 compressing module, implemented by the processor and configured to use Profile0 to perform data compression on packets to be compressed of a packet stream after receiving the CONTEXT_MEMORY option; and
a Profile type compressing module, implemented by the processor and configured to perform data compression using a Profile type to which the packets to be compressed belong after a number of the uses of the Profile0 to packets of the same packet stream or time for using the Profile0 to packets of the same packet stream reaches a first threshold.

9. The robustness header compressor according to claim 8, wherein, the robustness header compressor further comprises:
an initializing module, implemented by the processor and configured to initialize a first counter or a first timer after receiving the CONTEXT_MEMORY option;
the first counter or the first timer, implemented by the processor and configured to count a number of the uses of the Profile0 to packets of the same packet stream or counts time for using the Profile0 to packets of the same packet stream;
a threshold determining module, implemented by the processor and configured to determine whether the first threshold is reached by the first counter or the first timer;
wherein the Profile type compressing module is configured to determine that a first threshold is reached by using the Profile0 when the first counter or the first timer reaches the first threshold.

10. The robustness header compressor according to claim 9, wherein, the robustness header compressor further comprises a second counter or a second timer;

the initializing module is further configured to initialize the second counter or the second timer after receiving a CONTEXT_MEMORY option of a current packet stream for a first time;
the second counter or the second timer is implemented by the processor and configured to count a number of the receptions of the CONTEXT_MEMORY option or counts the time for using the Profile0 to packets of the same packet stream;
the threshold determining module is further configured to determine whether a second threshold is reached by the second counter or the second timer; and
the Profile0 compressing module is further configured to use the Profile0 continuously to perform data compression on packets to be compressed after the second threshold is reached.

11. The robustness header compressor according to claim 8, wherein, the compressor further comprises an option feedback identity maintaining module, implemented by the processor and configured to: set an option feedback identity as a first identity after receiving the CONTEXT_MEMORY option, set the option feedback identity as a second identity after receiving a feedback (ACK) representing a successful decompression and when the first counter or the first timer reaches the first threshold; and the first counter or the first timer is further used to reset after reaching the first threshold.

12. The robustness header compressor according to claim 11, wherein, the first counter or the first timer is further configured to count the number or count the time when the option feedback identity is the first identity, and stop counting the number or counting the time when the option feedback identity is the second identity.

13. The robustness header compressor according to claim 10, wherein, the second counter or the second timer is further configured to be cleared after receiving the ACK feedback.

14. The robustness header compressor according to claim 10, wherein, the first threshold is proportional to a current value of the current second counter or second timer.

15. A robustness header compression processing system, comprising the robustness header compressor according to claim 8, further comprising a decompressor, wherein, the decompressor is configured to only transmit a feedback (ACK) representing a successful decompression to the robustness header compressor when the decompression for data packets of a Profile type to which a packet stream belongs is successful for a first time after transmitting a feedback (NACK) of a failed decompression carrying a CONTEXT_MEMORY option.

16. The method according to claim 2, wherein, the compressor sets an option feedback identity as a first identity after receiving the CONTEXT_MEMORY option, sets the option feedback identity as a second identity after receiving a feedback (ACK) representing a successful decompression and when the first counter or the first timer reaches the first threshold, and the first counter or the first timer resets after reaching the first threshold.

17. The robustness header compressor according to claim 9, wherein, the compressor further comprises an option feedback identity maintaining module, implemented by the processor and configured to: set an option feedback identity as a first identity after receiving the CONTEXT_MEMORY option, set the option feedback identity as a second identity after receiving a feedback (ACK) representing a successful decompression and when the first counter or the first timer reaches the first threshold; and the first counter or the first timer is further used to reset after reaching the first threshold.

* * * * *